(12) United States Patent
Kobayashi et al.

(10) Patent No.: US 8,768,624 B2
(45) Date of Patent: Jul. 1, 2014

(54) VEHICLE OPERATION SUPPORT SYSTEM AND VEHICLE OPERATION SUPPORT METHOD

(75) Inventors: Yuichi Kobayashi, Yokohama (JP); Yuzuru Fukuda, Urayasu (JP); Masamori Kashiyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 70 days.

(21) Appl. No.: 13/322,234

(22) PCT Filed: May 26, 2010

(86) PCT No.: PCT/JP2010/003519
§ 371 (c)(1),
(2), (4) Date: Feb. 15, 2012

(87) PCT Pub. No.: WO2010/137307
PCT Pub. Date: Dec. 2, 2010

(65) Prior Publication Data
US 2012/0136574 A1    May 31, 2012

(30) Foreign Application Priority Data

May 26, 2009    (JP) ................................. 2009-126674

(51) Int. Cl.
*G01C 21/34* (2006.01)
*B60W 20/00* (2006.01)
*G05D 1/02* (2006.01)
*G01C 21/26* (2006.01)

(52) U.S. Cl.
CPC ............. *B60W 20/00* (2013.01); *B60W 20/102* (2013.01); *G05D 1/0278* (2013.01); *G01C 21/26* (2013.01); *G01C 21/34* (2013.01)
USPC ................ 701/533; 701/22; 701/25; 701/410

(58) Field of Classification Search
CPC .. B60W 20/00; B60W 20/102; G05D 1/0278; G01C 21/26; G01C 21/34
USPC ...................................... 701/22, 25, 410, 533
See application file for complete search history.

(56) References Cited

U.S. PATENT DOCUMENTS 5,790,976 A * 8/1998 Boll et al. .................. 455/456.5
5,815,824 A * 9/1998 Saga et al. ....................... 701/22

(Continued)

FOREIGN PATENT DOCUMENTS

CN    1580706       2/2005
JP    10-170293 A   6/1998

(Continued)

OTHER PUBLICATIONS

International Search Report from PCT/2010/003519 mailed on Jun. 22, 2010.

*Primary Examiner* — Calvin Cheung
(74) *Attorney, Agent, or Firm* — Volpe and Koenig, P.C.

(57) ABSTRACT

A vehicle drive support system, and its method, includes a storage apparatus for storing charging station information to manage attribute information containing position information of charging stations, a communication apparatus for receiving a route search request containing an origin, a destination, and a residual quantity in a battery from a mobile and transmitting a response to the route search request, and a route search processing unit for searching a route passing through the charging stations while maintaining a state in which the residual quantity in the battery is greater than 0 between the origin and the destination by using position information of the charging stations contained in the charging station information in response to the route search request received by the communication apparatus, and giving the searched route as the response to the route search request.

5 Claims, 7 Drawing Sheets

(56) References Cited

U.S. PATENT DOCUMENTS

| | | |
|---|---|---|
| 7,369,938 B2 | 5/2008 | Scholl |
| 8,154,246 B1* | 4/2012 | Heitmann ................. 320/109 |
| 2009/0082957 A1* | 3/2009 | Agassi et al. ............. 701/208 |
| 2009/0114463 A1* | 5/2009 | DeVault ................. 180/65.29 |
| 2009/0313034 A1* | 12/2009 | Ferro et al. .................. 705/1 |
| 2010/0094496 A1* | 4/2010 | Hershkovitz et al. ...... 701/22 |
| 2010/0134067 A1* | 6/2010 | Baxter et al. ............. 320/109 |
| 2010/0274570 A1* | 10/2010 | Proefke et al. ............ 705/1.1 |
| 2011/0224900 A1* | 9/2011 | Hiruta et al. ............. 701/201 |
| 2011/0288765 A1* | 11/2011 | Conway .................. 701/201 |
| 2011/0313652 A1* | 12/2011 | Hancock ................. 701/201 |
| 2012/0136574 A1* | 5/2012 | Kobayashi et al. ....... 701/533 |
| 2012/0161692 A1* | 6/2012 | Kobayashi et al. ....... 320/101 |
| 2012/0179323 A1* | 7/2012 | Profitt-Brown et al. ... 701/29.1 |
| 2012/0268061 A1* | 10/2012 | Bhageria et al. .......... 320/107 |
| 2012/0271758 A1* | 10/2012 | Jammer ..................... 705/39 |
| 2013/0154561 A1* | 6/2013 | Gadh et al. ............... 320/109 |
| 2013/0158868 A1* | 6/2013 | Chen et al. ............... 701/527 |
| 2013/0179057 A1* | 7/2013 | Fisher et al. ............. 701/117 |
| 2013/0226441 A1* | 8/2013 | Horita ..................... 701/118 |
| 2014/0025226 A1* | 1/2014 | Brown et al. ................ 701/1 |

FOREIGN PATENT DOCUMENTS

| | | |
|---|---|---|
| JP | 2006-112932 A | 4/2006 |
| JP | 3900993 B2 | 1/2007 |

* cited by examiner

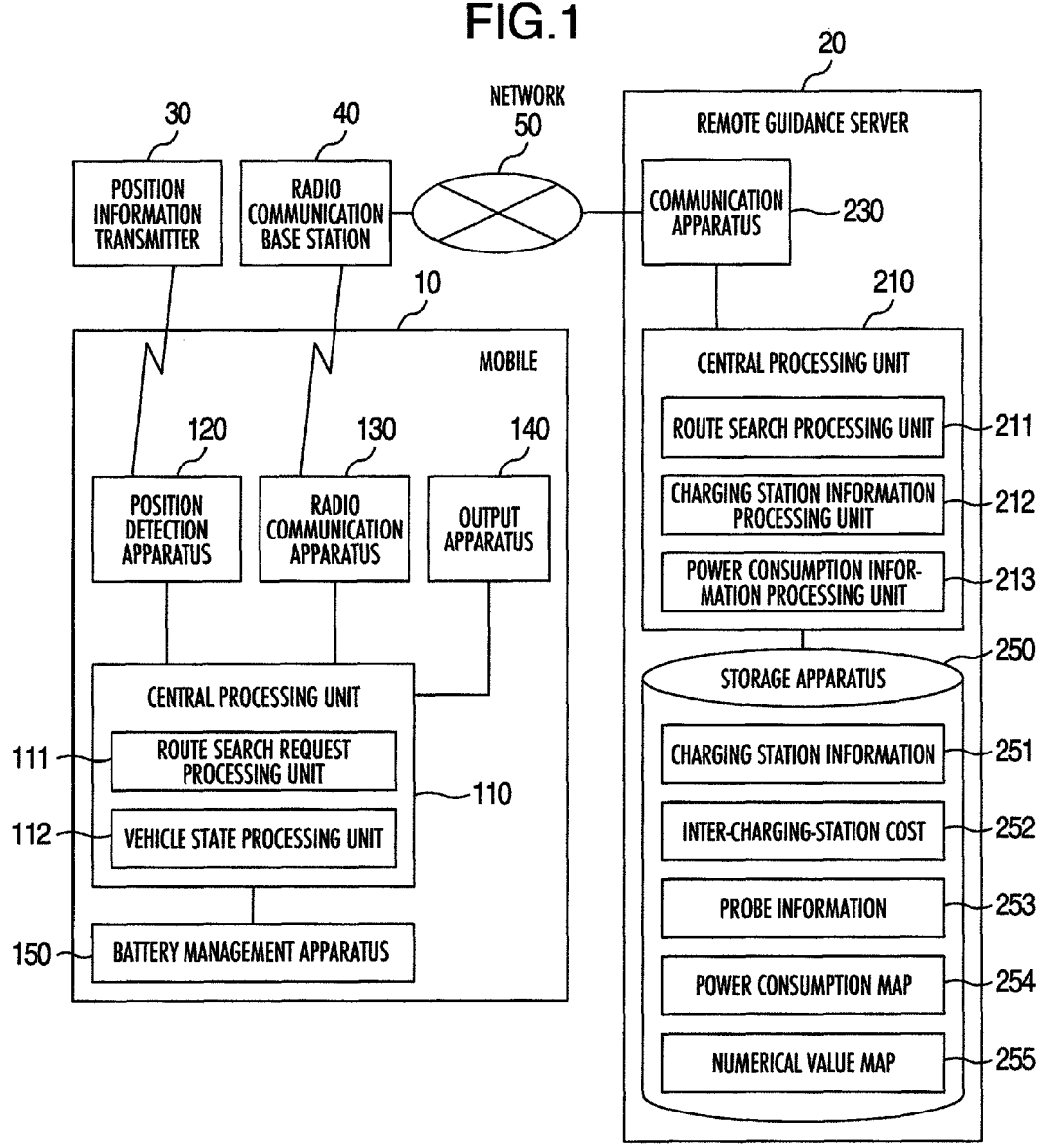

FIG.3

| ORIGIN CHARGING STATION ID (2520) | DESTINATION CHARGING STATION ID (2521) | SEARCH CONDITION (2522) | ORIGIN DATE AND HOUR ID (2523) | TRAVELING DISTANCE (2524) | TRIP TIME (2525) | POWER CONSUMPTION QUANTITY (2526) |
|---|---|---|---|---|---|---|
| 111110 | 111111 | PREFERENCE FOR TOLL ROAD | Sun 12:00 | 2,345km | 5min | 333wh |

FIG.4

| VEHICLE ID (2530) | LATITUDE (2531) | LONGITUDE (2532) | RESIDUAL QUANTITY IN BATTERY (2533) | DATE AND HOUR (2534) |
|---|---|---|---|---|
| XXX001 | 35.666 | 139.700 | 10012wh | 3/3 12:00 |

FIG.5

| LEVEL (2540) | MESH ID (2541) | LINK ID (2542) | POWER CONSUMPTION QUANTITY (2543) |
|---|---|---|---|
| 2 | 123456 | 222222 | 60wh |

| CHARGING STATION ID | FIXING INFORMATION | IMMEDIATELY PRECEDING CHARGING STATION ID | COST |
|---|---|---|---|
| 2550 | 2551 | 2552 | 2553 |
| 111111 | FIXED / UNFIXED | 111110 | 150 |

$$\binom{d}{t}_{OB} \approx \binom{d'}{t'}_{OB} = \binom{d}{t}_{OA} \cos\theta_{AOB} + \binom{d}{t}_{AB} \cos\theta_{ABO}$$

VEHICLE OPERATION SUPPORT SYSTEM AND VEHICLE OPERATION SUPPORT METHOD

INCORPORATION BY REFERENCE

The present application claims the benefit of priority of Japanese patent application No. 2009-126674 filed May 26, 2009, which is herein incorporated by reference in its entirety.

TECHNICAL FIELD

The present invention relates to an electromotive vehicle (mobile object) which travels with a charged battery, such as an electric automobile or an electromotive two-wheeled vehicle, and in particular to a drive support system and a drive support method.

BACKGROUND ART

In an initial stage in which an electric automobile which travels with power charged in a battery is put on the market, the distance over which the electric automobile can travel when fully charged is short and the number of charging stations where the electric automobile can be charged is small, and consequently the driver is anxious about long distance drive. To cope with this, a technique for giving a sense of security to the driver by making a decision whether battery charging at a driver's destination is possible and displaying charging stations in the vicinity of a retrieved driver's destination or in the vicinity of routes to the driver's destination when the charging at the driver's destination is judged to be impossible is disclosed in patent literature 1 and patent literature 2.

CITATION LIST

Patent Literatures

Patent literature 1: SP-B-3900993
Patent literature 2: JP-A-2006-112932

SUMMARY OF INVENTION

Technical Problem

Even if it is attempted to set a route (traveling route) passing through charging stations which are located in the vicinity of the driver's destination or in the vicinity of the path to the driver's destination and which can be arrived at, however, there is a possibility that there will be no suitable charging stations in the vicinity of the driver's destination or in the vicinity of the path, and a route passing through a different charging station becomes a desirable route in some cases.

Solution to Problem

A vehicle drive support system and its method according to the present invention have a configuration described hereafter. The configuration includes a storage apparatus for storing charging station information to manage attribute information containing position information of charging stations; a communication apparatus for receiving a route search request containing an origin, a destination, and a residual quantity in a battery from a mobile and transmitting a response to the route search request; and a route search processing unit for searching a route passing through the charging stations while maintaining a state in which the residual quantity in the battery is greater than 0 between the origin and the destination by using position information of the charging stations contained in the charging station information in response to the route search request received by the communication apparatus, and giving the searched route as the response to the route search request.

According to another aspect of the present invention, the configuration further includes a charging station information processing unit for calculating a cost between charging stations on the basis of the position information of the charging stations and storing the cost in the storage apparatus as inter-charging-station cost information, and the route search processing unit searches a minimum cost route as the route passing through the charging stations by using the inter-charging-station cost information stored in the storage apparatus.

According to still another aspect, the charging station information contains real time information such as business hours and full/vacancy situations of the charging stations as the attribute information, and the charging station information processing unit calculates the cost between the charging stations depending upon the attribute information.

According to yet another aspect, the cost is at least one of a traveling distance, a trip time, and a power consumption quantity of the mobile.

According to a further aspect, the configuration further includes a power consumption information processing unit for estimating a power consumption quantity of a road section corresponding to position information of the mobile on the basis of probe information containing the position information of the mobile and the residual quantity in the battery transmitted by the mobile and storing the estimated power consumption quantity in the storage apparatus as a power consumption map, and the route search processing unit calculates a power consumption quantity of the mobile by using the power consumption map stored in the storage apparatus, and evaluates whether the state in which the residual quantity in the battery is greater than 0 can be maintained on the basis of the calculated power consumption quantity.

Advantageous Effects of Invention

According to the present invention, it is possible to extract charging stations which make possible to travel without battery exhaustion (in a state in which the power quantity representing the residual quantity in the battery >0), output a route which passes through the extracted charging stations to a mobile, and support the drive of the mobile.

BRIEF DESCRIPTION OF DRAWINGS

FIG. 1 is a diagram showing an example of a configuration of a drive support system oriented for mobile;

FIG. 2 is a diagram showing an example of charging station information;

FIG. 3 is a diagram showing an example of an inter-charging-station cost;

FIG. 4 is a diagram showing an example of probe information;

FIG. 5 is a diagram showing an example of a power consumption map;

DESCRIPTION OF EMBODIMENTS

Figure 6:
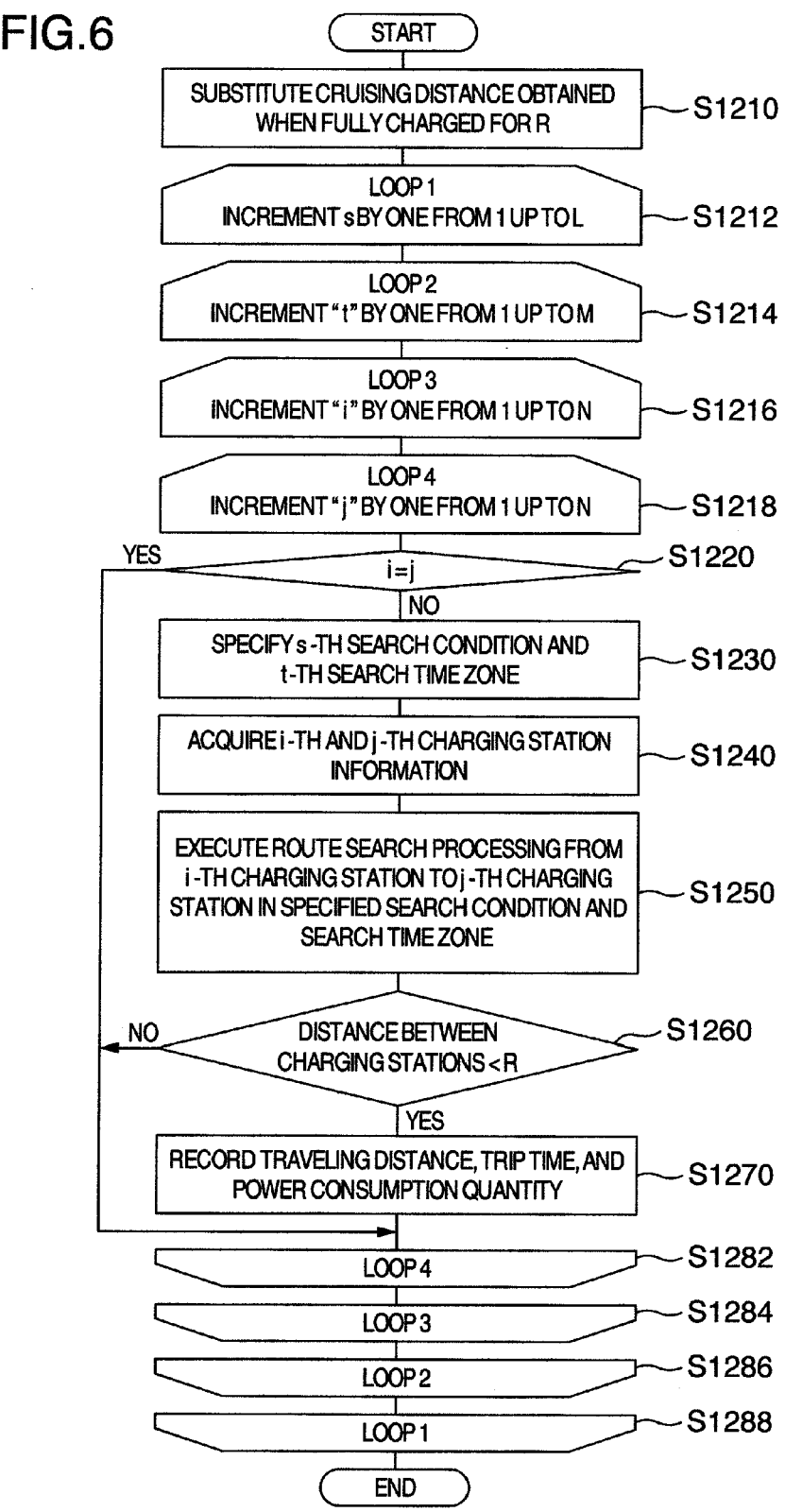
FIG. 6 is a flow chart showing an example of processing conducted by a charging station information processing unit.

Hereafter, embodiments of the present invention will be described with reference to the drawings. In the present embodiment, a remote guidance server receives an origin, a destination, and a residual quantity in a battery (power quantity) from a mobile (vehicle) which travels using power charged in the battery, generates information of a route passing through charging stations which corresponds to the received residual quantity in the battery (available power quantity) on the basis of charging station information retained by the remote guidance server, and outputs (transmits) the route information to the mobile. The charging station corresponds to the gasoline station for gasoline vehicles, and the charging station is a place having facilities for providing electromotive vehicles with charging service. The charging station may be a gasoline station or a parking lot having ordinary charging facilities or rapid charging facilities.

FIG. 1 is a configuration diagram of a drive support system oriented for mobile. As illustrated, the drive support system oriented for mobile includes a mobile 10; a remote guidance server 20 which gives route information toward the mobile 10; a position information transmitter 30 which transmits information to be used by the mobile 10 to detect its own position, from external of the mobile 10; a radio communication base station 40 which is a coupling destination of a radio communication line from the mobile 10; and a network 50 which couples the remote guidance server 20 and the radio communication base station 40 to each other. The mobile 10 and the remote guidance server 20 conduct communication via the radio communication base station 40 and the network 50. Generally, a plurality of radio communication base stations 40 are coupled to one remote guidance server 20 via the network 50. The radio communication base station can communicate with a plurality of traveling bodies 10 simultaneously.

Or the drive support system oriented for mobile may have a relay terminal between it and the mobile 10, and the mobile 10 and the remote guidance server 20 may communicate with other via the relay terminal and the network 50. The relay terminal is a PC or the like which transfers data via bridge media such as a USB memory and which is coupled to the network. Generally, a plurality of relay terminals are coupled to one remote guidance server 20 via the network 50. The relay terminal can conduct data transfer with a plurality of traveling bodies 10 via the bridge media.

The mobile 10 is an electromotive vehicle such as, for example, an electric automobile or an electromotive two-wheeled vehicle. The remote guidance server 20 may be included as a partial function of a telematics service ("union of a communication technique and information service," and especially in Japan, fusion service of the Internet and a vehicle mounted information radio technique) providing server and a general ASP (Application Service Provider) server. The position information transmitter 30 may be a position information transmitter installed on a pedestrian zone, or may be an earth satellite for GPS (Global Positioning System) or a light beacon. The radio communication base station 40 may be a base station (access point) for the portable telephone, PHS or radio LAN. The network 50 may be a portable telephone network, or may be an Internet network.

Here, the mobile 10 will be described as a vehicle which mounts a radio communication apparatus and which is coupled to the remote guidance server 20 by radio communication.

The mobile 10 mounts a position detection apparatus 120 which detects the position of the mobile 10 by using an apparatus corresponding to the position information transmitter 30 such as the GPS or light beacon, or an autonomous navigation apparatus based on vehicle speed pulses or a gyroscope; a radio communication apparatus 130 such as a portable telephone, a PHS, or a radio LAN; an output apparatus 140 such as a liquid crystal display or a speaker; a battery management apparatus 150 which conducts battery state management such as measurement of the residual quantity in the battery; and a central processing unit (CPU) 110. The central processing unit (CPU) 110 is coupled to the position detection apparatus 120, the radio communication apparatus 130, the output apparatus 140, the battery management apparatus 150, and the like. The central processing unit (CPU) 110 implements a function of transmitting a vehicle state to the remote guidance server 20 and receiving a searched route.

By executing a program, the central processing unit 110 implements a route search request processing unit 111 which transmits position information of the origin and destination and the residual quantity in the battery to the remote guidance server 20 and acquires route search result information 151 from the remote guidance server 20; and a vehicle state processing unit 112 which periodically transmits the position information of the mobile 10 acquired from the position detection apparatus 120 and the residual quantity in the battery of the mobile 10 acquired from the battery management apparatus 150, to the remote guidance server 20.

The remote guidance server 20 includes a communication apparatus 230 for coupling to the network 50; a storage apparatus 250 such as a hard disk for storing charging station information 251, a numerical value map 255, and the like; and a central processing unit (CPU) 210 which is coupled to the communication apparatus 230 and the storage apparatus 250 and which implements route search and the like.

By executing a program, the central processing unit 210 implements a route search processing unit 211 which receives the position information of the origin and the destination and the residual quantity in the battery transmitted by the mobile 10 via the communication apparatus 230, and conducts route search by using the charging station information 251, an inter-charging-station cost 252, probe information 253, a power consumption map 254, and the numerical value map 255 in the storage apparatus 250; a charging station information processing unit 212 which updates the charging station information 251 and generates the inter-charging-station cost 252 from the charging station information 251; and a power consumption information processing unit 213 which stores the position information and the residual quantity in the battery transmitted periodically by the mobile 10 in the storage apparatus 250 as the probe information 253, conducts statistical processing on the collected probe information 253, calculates estimated power consumption quantity of every road (section), and stores the calculated estimated power consumption quantity in the storage apparatus 250 as the power consumption map 254.

In an alternative configuration, the route search processing unit 211, the charging station information processing unit 212, and the power consumption information processing unit 213 implemented by the central processing unit 210 in the remote guidance server 20 are implemented by the central processing unit 110 in the mobile 10 instead of in the remote guidance server 20; the charging station information 251, the inter-charging-station cost 252, the probe information 253, the power consumption map 254, and the numerical value map 255 stored in the storage apparatus 250 in the remote guidance server 20 are stored in a storage apparatus in the mobile 10 instead of in the remote guidance server 20; and the mobile 10 generates information of a route passing through charging stations corresponding to the residual quantity in the battery (available power quantity) on the basis of the charging station information retained by the mobile 10 itself and the origin, the destination and the residual quantity in the battery (power quantity), and outputs the route information to the output apparatus.

In the ensuing description, it is supposed that the mobile 10 and the remote guidance server 20 are coupled to each other by radio communication and the remote guidance server 20 receives the origin, the destination and the residual quantity in the battery (power quantity) from the mobile 10, generates information of a route passing through charging stations corresponding to the received residual quantity in the battery (available power quantity) on the basis of the charging station information retained by the remote guidance server 20, and outputs (transmits) the route information to the mobile 10.

FIG. 2 is a diagram showing an example of charging station information 251 for managing attribute information of charging stations. Items in the charging station information 251 are a charging station ID 2510 which identifies a charging station, a name 2511 of the charging station, latitude 2512 which represents the position of the charging station, longitude 2513, an address 2514, business hours 2515 of the charging station, a charging method 2516 supported by the charging station, and full/vacancy information 2517 which represents the current state of crowdedness of the charging station (a full state or a state in which there is a vacancy). Information of these kinds is stored in the storage apparatus 250 every charging station.

FIG. 3 is a diagram showing an example of the inter-charging-station cost 252 for managing a traveling distance and a trip time (traveling time) between charging stations. The charging station information processing unit 212 in the remote guidance server 20 generates the inter-charging-station cost 252 from the charging station information 251 by using the route search processing unit 211. Items in the inter-charging-station cost 252 are an origin charging station ID 2520 which identifies a charging station serving as an origin; a destination charging station ID 2521 which identifies a charging station serving as a destination; a search condition 2522 for route search such as preference for a toll road, preference for a general road, or preference for the distance; an origin date and hour ID 2523 identifying a time zone in which the mobile departs from the charging station; a traveling distance 2524 obtained as a result of conducting route search between the charging station in the origin charging station ID 2520 and the charging station in the destination charging station ID 2521 in the time zone in the origin date and hour ID 2523 under the condition in the search condition 2522; a trip time 2525; and a power consumption quantity 2526. The traveling distance 2524, the trip time 2525, and the power consumption quantity 2526 are stored in the inter-charging-station cost 252, every combination in which the traveling distance 2524 is equal to or less than a cruising range (traveling distance made possible by conducting full charging once) obtained when a general electromotive vehicle is fully charged, among all combinations of charging stations stored in the charging station information 251. The traveling distance 2524, the trip time 2525, and the power consumption quantity 2526 may be stored in the inter-charging-station cost 252, every search condition at the time of route search such as the preference for a toll road, the preference for a general road, or the preference for the distance. Furthermore, the traveling distance 2524, the trip time 2525, and the power consumption quantity 2526 may be stored in the inter-charging-station cost 252, every day of the week, such as Saturday, Sunday, weekday except Saturday, and festival day, or every time zone with an hour taken as the unit.

FIG. 4 is a diagram showing an example of probe information 253 received from the mobile 10 by the remote guidance server 20. Items in the probe information 253 are a vehicle ID 2530 which identifies the mobile 10; latitude 2531 which represents the position of the mobile 10; longitude 2532; a residual quantity 2533 in the battery in the mobile 10; and date and hour 2534 when the mobile 10 measured the latitude 2531, the longitude 2532, and the residual quantity 2533 in the battery. Information of these kinds is stored in the storage apparatus 250 every mobile 10.

FIG. 5 is a diagram showing an example of a power consumption map 254 for managing an estimated power consumption quantity between intersections on a road (intersections are used only for a reason that they can be used easily as information which indicates certain spots, and a road section between spots may be used instead of between intersections if the spots can be specified). The power consumption information processing unit 213 in the remote guidance server 20 calculates the power consumption map 254 by conducting statistical processing on the probe information 253. Items in the power consumption map 254 are a level 2540 which represents a degree of particularity of the map; a mesh ID 2541 which identifies a mesh obtained when the map in the level 2540 is divided into mesh units; a link ID 2542 which identifies a link having one intersection in the mesh ID 2341 as a start point and another intersection as an end point; and a power consumption quantity 2543 which represents a power quantity consumed by the mobile in the link ID 2542. Information of these kinds is stored in the storage apparatus 250 every inter-intersections. The intersection serving as the end point may be located in the same mesh as that of the intersection serving as the start point, or may be located in a mesh different from that of the intersection serving as the start point. The reason why the power consumption quantity 2543 corresponding to a unidirectional link from a start point to an end point is that the power consumption quantity differs from that in the opposite direction sometimes as in the case where a route corresponding to a link is a sloping road.

FIG. 6 is a flow chart showing a flow in which the inter-charging-station cost 252 is generated by processing conducted by the central processing unit (CPU) 210 mounted on the remote guidance server 20 (conducted by the charging station information processing unit 212). The charging station information processing unit 212 is started to execute the processing by an operator of the remote guidance server 20 at a rate of, for example, once every four months.

The charging station information processing unit 212 in the remote guidance server 20 sets a cruising range of a general electromotive vehicle obtained when fully charged as R (substitutes the cruising range for a variable R) (S1210). For example, R=200 km is set. In the ensuing description, it is supposed that the cruising range of a general electromotive vehicle obtained when fully charged is R. However, a corresponding cruising range R may be used every vehicle kind or model year.

The charging station information processing unit 212 in the remote guidance server 20 increments a variable "s" by one from 1 up to the number L of kinds of the search condition in order to calculate a cost every search condition at the time of route search such as preference for a toll road, preference for a general road, or preference for the distance (S1212).

The charging station information processing unit 212 in the remote guidance server 20 increments a variable "t" by one from 1 up to the number M of kinds of the time zone in order to calculate a cost every day of the week, such as Saturday, Sunday, weekday except Saturday, and festival day, or every time zone with an hour taken as the unit (S1214).

The charging station information processing unit 212 in the remote guidance server 20 increments a variable "i" by one from 1 up to the number N of charging stations stored in the charging station information 251 in order to check all combinations of charging stations stored in the charging station information 251 (S1216).

The charging station information processing unit 212 in the remote guidance server 20 increments a variable "j" by one from 1 up to the number N of charging stations stored in the charging station information 251 in order to check all combinations of charging stations stored in the charging station information 251 (S1218).

The charging station information processing unit 212 in the remote guidance server 20 compares the value of "i" with the value of "j" (S1220). If "i" is different from "j," then the charging station information processing unit 212 proceeds to S1220. If "i" is equal to "j," then the charging station information processing unit 212 proceeds to S1282, because the charging stations are the same.

If "i" is different from "j" at S1220, then the charging station information processing unit 212 in the remote guidance server 20 determines an sth search condition and a tth search time zone (S1230).

The charging station information processing unit 212 in the remote guidance server 20 acquires latitudes 2512 and longitudes 2513 in the ith and jth charging station information from the charging station information 251 (S1240).

The charging station information processing unit 212 in the remote guidance server 20 executes route search processing from the latitude and longitude of the ith charging station acquired at S1240 to the latitude and longitude of the jth charging station, in accordance with the sth search condition and the tth search time zone determined at S1230 (S1250).

The charging station information processing unit 212 in the remote guidance server 20 calculates a power consumption quantity between the charging stations as regards the route searched at S1250 by using the power consumption map 255 (adds together the power consumption quantities 2543 of respective link IDs 2542 from the ith charging station to the jth charging station), and compares the calculated result with a power quantity of a general electromotive vehicle obtained when fully charged (S1260). The power consumption quantity between the charging stations may be calculated by simply multiplying a ratio of the cruising distance R of the general electromotive vehicle obtained when fully charged to a traveling distance between charging stations by the power quantity obtained when fully charged. If the calculated power consumption quantity between charging stations is smaller than the power quantity obtained when fully charged, the charging station information processing unit 212 proceeds to S1270. If the calculated power consumption quantity between charging stations is equal to at least the power quantity obtained when fully charged, the charging station information processing unit 212 proceeds to S1282. By the way, the reason why not power quantity comparison but distance comparison is shown is that the power consumption quantity can be obtained by multiplying the power consumption quantity per unit distance by the distance. In other words, either of the power quantity comparison and the distance comparison may be used at S1260.

If the jth charging station can be reached at S1260, the charging station information processing unit 212 in the remote guidance server 20 records cost data (the traveling distance 2524, the trip time 2525, and the power consumption quantity 2526) in the inter-charging-cost 252 to be associated with the origin charging station ID 2520 of the ith charging station, the destination charging station ID 2521 of the jth charging station, the sth search condition 2522, and the tth origin date and hour ID 2523 (S1270).

If j is N or less, the charging station information processing unit 212 in the remote guidance server 20 returns to S1218 (S1282). If j is equal to N, the charging station information processing unit 212 proceeds to S1284.

If i is N or less, the charging station information processing unit 212 in the remote guidance server 20 returns to S1216 (S1284). If i is equal to N, the charging station information processing unit 212 proceeds to S1286.

If t is M or less, the charging station information processing unit 212 in the remote guidance server 20 returns to S1214 (S1286). If t is equal to M, the charging station information processing unit 212 proceeds to S1288.

If s is L or less, the charging station information processing unit 212 in the remote guidance server 20 returns to S1212 (S1288). If s is equal to L, the charging station information processing unit 212 finishes the processing for generating the inter-charging-station cost 252.

Figure 7:
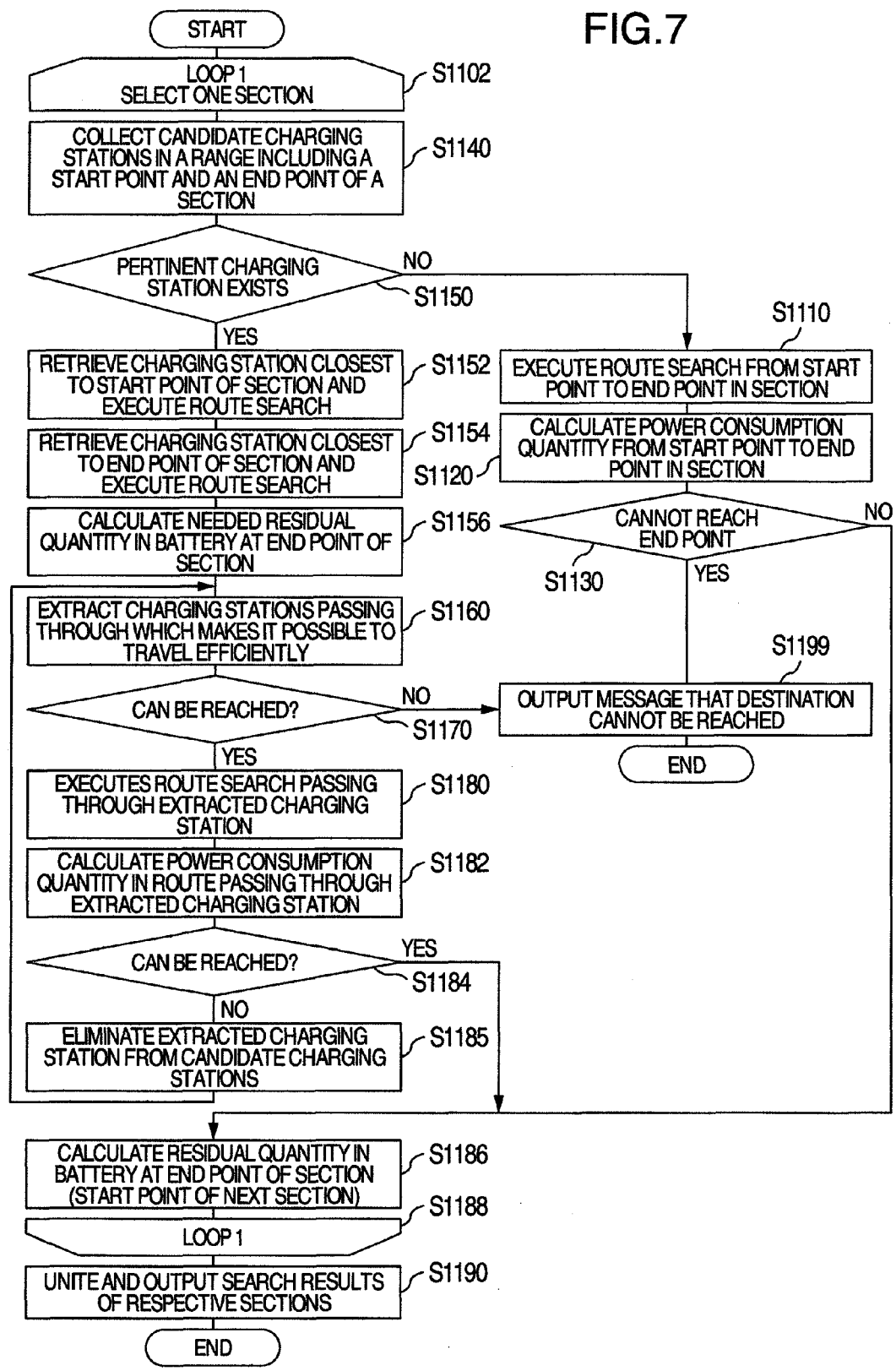
FIG. 7 is a flow chart showing an example of processing conducted by a route search processing unit.

FIG. 7 is a flow chart showing route search conducted by processing (the route search processing unit 211) in the central processing unit (CPU) 210 which is mounted on the remote guidance server 20. In response to a request from a user who utilizes the mobile 10, the route search request processing unit 111 in the central processing unit (CPU) 110 mounted on the mobile 10 transmits a route search request to the remote guidance server 20 via the network 50. In response to reception of the route search request, the remote guidance server 20 (the route search processing unit 211) starts processing. A user who utilizes a terminal device such as a relay terminal coupled to the network 50 may issue a request to the remote guidance server 20 to start the processing. The route search request contains latitudes and longitudes of the origin, destination and waypoint, the residual quantity in the battery, the search condition, and the origin time zone. Furthermore, the user may previously specify at least one charging station to be passed through. A charging station specified here is referred to as specified charging station.

The latitudes and longitudes of the origin and destination are indispensable items. The route search processing unit 211 in the remote guidance server 20 returns an error notice in response to a route search request which does not contain them. The latitude and longitude of the waypoint, the residual quantity in the battery, the search condition, the origin time zone, and the specified charging station are arbitrary items.

As for items which are included in the latitudes and longitudes of the waypoint and the specified charging station and which are not contained (specified) in the route search request, the route search processing unit 211 in the remote guidance 20 conducts processing on the route search request without considering these items. As for items which are included in the residual quantity in the battery, the search condition, and the origin time zone and which are not contained (specified) in the route search request, the route search processing unit 211 in the remote guidance server 20 conducts processing by utilizing preset initial values. For example, the initial value of the residual quantity in the battery is "20 kwh," the initial value of the search condition is "preference for a toll road," and the initial value of the origin time zone is "Sun. 12:00."

Figures 9, 10, 11:
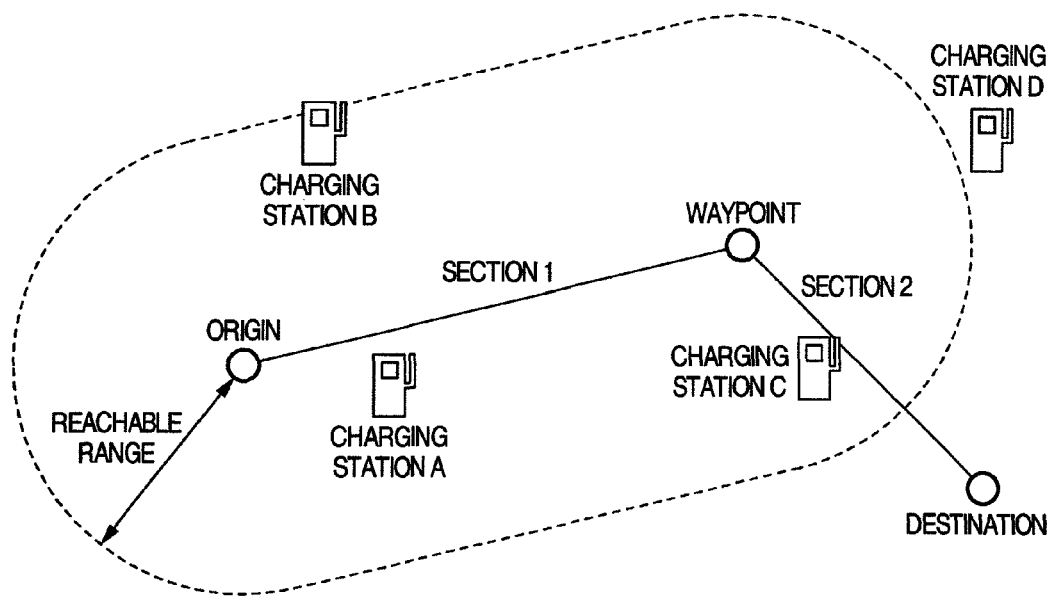
FIG. 9 is a diagram showing an example of position relations among an origin, a waypoint, a destination, and charging stations
FIG. 10 is a diagram showing an example of node information.
FIG. 11 shows an example of an approximate formula for calculating a traveling distance and a traveling time.

The route search processing unit 211 in the remote guidance server 20 receives the latitudes and longitudes of the origin and destination which are indispensable items contained in the route search request which is transmitted by the mobile 10, a relay terminal, or the like, and specified items among the latitude and longitude of the waypoint, the residual quantity in the battery, the search condition, the origin time zone, and the specified charging station which are arbitrary items, and selects one section beginning with the origin (S1102). As shown in FIG. 9, the "section" means a part between adjacent spots which are included in the origin, the waypoint and the destination. Although the waypoint is one in number in FIG. 9, the number of waypoints may be 0 or may be at least two. Therefore, the number of sections is always greater than the number of waypoints by one. Furthermore, a start point of the first section becomes the origin, and an end point of the last section becomes the destination.

The route search processing unit 211 in the remote guidance server 20 retrieves charging stations included in an ellipse which includes a start point and an end point of a section and which has a vicinity of a middle point between the start point and the end point of the section as its center, from the charging station information 251, and records the charging stations as candidate charging stations (S1140). As for the candidate charging stations, charging stations each located at a distance within a range distance from a straight line coupling the start point and end point of the section may be selected. The range distance may be a distance over which the mobile can cruise with a residual quantity in the battery at the start point of the section, or may be half of the distance between the start point and the end point of the section. For example, when a section 1 shown in FIG. 9 is taken as an object, a charging station A, a charging station B, and a charging station C located within the range distance from a straight line which couples the origin and the waypoint are selected as candidate charging stations.

The route search processing unit 211 in the remote guidance server 20 makes a decision whether a pertinent charging station exists on the basis of a result of the search conducted at S1140 (S1150). If the charging station exists, the route search processing unit 211 in the remote guidance server 20 proceeds to S1152. If the charging station does not exist, the route search processing unit 211 in the remote guidance server 20 proceeds to S1110.

If the charging station does not exist at S1150, then the route search processing unit 211 in the remote guidance server 20 executes route search from the start point to the end point in the section by using the numerical value map 255 stored in the storage apparatus 250 on the basis of latitudes and longitudes of the start point and the end point in the pertinent section, and the search condition and the origin time zone contained in the route search request (S1110).

The route search processing unit 211 in the remote guidance server 20 calculates the power consumption quantity from the start point to the end point in the section on the basis of the power consumption map 255 corresponding to the route obtained by the search at S1110 (S1120). As for the calculation of the power consumption quantity from the start point to the end point in the section, power consumption quantities of respective links may be summed up, or the ratio of the power quantity obtained when fully charged to the cruising distance of the general electromotive vehicle obtained when fully charged may be multiplied by a traveling distance from the start point to the end point in the section, as described in the explanation of S1260.

The route search processing unit 211 in the remote guidance server 20 compares the power consumption quantity from the start point to the end point in the section obtained at S1120 with the residual quantity in the battery at the start point of the section (available power quantity) (S1130). It is estimated at S1130 whether the mobile can travel from the start point to the end in the section with the residual quantity in the battery obtained at the start point of the section without being charged. If the power consumption quantity from the start point to the end in the section is at least the residual quantity in the battery, that is, if the mobile cannot travel from the start point to the end point in the section with the residual quantity in the battery without being charged, then the route search processing unit 211 in the remote guidance server 20 proceeds to S1199. If the power consumption quantity from the start point to the end in the section is less than the residual quantity in the battery, that is, if the mobile can travel from the start point to the end point in the section with the residual quantity in the battery without being charged, then the route search processing unit 211 in the remote guidance server 20 proceeds to S1186.

If the charging station exists at S1150, then the route search processing unit 211 in the remote guidance server 20 retrieves a charging station in the vicinity of the start point which is the closest to the start point of the section from the charging station information 251 as preparation for estimating the cruising distance and the cruising time from the start point of the section to each charging station, and executes route search from the start point of the section to the charging station in the vicinity of the start point by using the numerical value map 255 stored in the storage apparatus 250 on the basis of latitudes and longitudes of the start point and the charging station in the vicinity of the start point, and the search condition and the origin time zone contained in the route search request (S1152). For example, when the section 1 shown in FIG. 9 is taken as an object, the charging station in the vicinity of the start point is the charging station A, and route search from the origin to the charging station A is executed. A method for estimating a cruising distance and a cruising time from the start point of the section to each charging station and will be described with reference to S4110 in FIG. 8.

As preparation for estimating the cruising distance and the cruising time from each charging station to the end point of the section, the route search processing unit 211 in the remote guidance server 20 retrieves a charging station in the vicinity of the end point which is closest to the end point of the section from the charging station 251, and executes route search from the charging station in the vicinity of the end point to the end point of the section by using the numerical value map 255 stored in the storage apparatus 250 on the basis of latitudes and longitudes of the end point and the charging station in the vicinity of the end point and the search condition and the origin time zone contained in the route search request (S1154). For example, when the section 1 shown in FIG. 9 is taken as an object, the charging station in the vicinity of the end point is the charging station C, and route search from the charging station C to the waypoint is executed. A method for estimating a cruising distance and a cruising time from each charging station to the end point of the section will be described with reference to S4110 in FIG. 8.

Since charging cannot be conducted at the waypoint, at least a residual quantity in the battery with which the mobile can cruise as far as a nearby charging station is needed when it has arrived at the waypoint. Therefore, the route search processing unit 211 in the remote guidance server 20 calculates the needed residual quantity in the battery (S1156). For example, if the section is the final section (that is, the end point of the section is the destination), the needed residual quantity is 0. Otherwise (that is, if the end point of the section is the waypoint), the needed residual quantity in the battery is calculated from a result of the route search from the charging station in the vicinity of the end point to the end point of the section found at S1154. As for the calculation method, power consumption quantities of respective links may be summed up, or the ratio of the power quantity obtained when fully charged to the cruising distance of the general electromotive vehicle obtained when fully charged may be multiplied by a traveling distance from the charging station in the vicinity of the end point to the end point of the section, as described in the explanation of S1260. Or in order to raise the precision, route search from the end point of the section to the charging station in the vicinity of the end point may be executed to calculate the needed residual quantity in the battery on the basis of a result of the search.

The route search processing unit 211 in the remote guidance server 20 extracts charging stations passing through which makes it possible to travel efficiently without battery exhaustion (with the residual quantity in battery >0) from among the charging stations retrieved at S1140 (S1160). A concrete method for extracting a charging station will be described later with reference to FIG. 8.

The route search processing unit 211 in the remote guidance server 20 makes a decision whether a charging station to be passed through exists and whether the end point of the section can be reached, on the basis of a result of processing conducted at S1160 (S1170). It is estimated at S1170 whether the mobile can travel from the start point to the end in the section by charging the battery at the charging station to be passed through. If the end point can be reached, the route search processing unit 211 in the remote guidance server 20 proceeds to S1180. If the end point cannot be reached, the route search processing unit 211 in the remote guidance server 20 proceeds to S1199.

If the end point of the section can be reached as a result of the decision at S1170, then the route search processing unit 211 in the remote guidance server 20 executes route search from the start point of the section to the end point of the section via the charging stations by using the numerical value map 255 stored in the storage apparatus 250 on the basis of the latitude and longitude of at least one charging station extracted at S1160, and the search condition and the origin time zone contained in the route search request (S1180). A charging station is not always extracted at S1160. If a charging station is not extracted at S1160, then the route search processing unit 211 in the remote guidance server 20 executes route search from the start point to the end point in the section without passing through a charging station.

The route search processing unit 211 in the remote guidance server 20 calculates a power consumption quantity from the start point to the end point in the section on the basis of the power consumption map 255 corresponding to the route searched at S1180 (S1182). As for the calculation of the power consumption quantity from the start point to the end point in the section, power consumption quantities of respective links may be summed up, or the ratio of the power quantity obtained when fully charged to the cruising distance of the general electromotive vehicle obtained when fully charged may be multiplied by a traveling distance from the start point to the end point in the section, as described in the explanation of S1260.

The route search processing unit 211 in the remote guidance server 20 compares the power consumption quantity from the start point to the end point in the section obtained at S1182 with the residual quantity in the battery at the start point of the section (available power quantity) and the residual quantity in the battery obtained after charging at the charging station on the way extracted at S1160 (S1184). It is estimated at S1184 whether the mobile which has departed from the start point of the section with a residual quantity in the battery at the start point of the section can travel from the start point to the end in the section by charging at the charging station on the way. If the power consumption quantity from the start point of the station to the charging station on the way is at least the residual quantity in the battery, if the power consumption quantity from a charging station on the way to the next charging station is at least the residual quantity in the battery obtained when fully charged, or if the power consumption quantity from a charging station on the way to the end point of the section is at least a difference between the residual quantity in the battery obtained when fully charged and the needed residual quantity in the battery calculated at S1156, that is, if it is impossible to travel from the start point to the end point in the section with the residual quantity in the battery, then the route search processing unit 211 in the remote guidance server 20 proceeds to S1199. Otherwise, that is, if the mobile which has departed from the start point of the section with a residual quantity in the battery can travel from the start point to the end point in the section with the needed residual quantity in battery left by charging at a charging station on the way, then the route search processing unit 211 in the remote guidance server 20 proceeds to S1186.

If it is impossible to arrive at the end point of the section as a result of the decision at S1184, then the route search processing unit 211 in the remote guidance server 20 eliminates the charging station extracted at S1160 from the candidate charging stations, and returns to S1160 (S1185). Or the route search processing unit 211 in the remote guidance server 20 may slightly decrease the value of the residual quantity in the battery at the start point of the section or the residual quantity in the battery obtained when fully charged and return to S1160. As a result, a charging station in closer vicinity is extracted at S1160, and consequently the possibility that the end point of the section can be reached is increased.

If the end point of the section can be reached as a result of the decision at S1130 or S1184, then the route search processing unit 211 in the remote guidance server 20 calculates the residual quantity in the battery at the end point of the section (that is, at a start point of the next section) (S1186).

If there is the next section, the route search processing unit 211 in the remote guidance server 20 returns to S1102. If the section is the final section (that is, the end point of the section is the destination), the route search processing unit 211 in the remote guidance server 20 proceeds to S1190.

The route search processing unit 211 in the remote guidance server 20 unites and outputs the routes of the sections generated at S1110 or S1180, and finishes the processing for conducting route search (S1190). Information which is output by the route search processing unit 211 in the remote guidance server 20 may not be information of the route but may be only information of a relaying charging station.

If the end point of the section cannot be reached at S1130 or S1170 and finally the destination cannot be reached, then the route search processing unit 211 in the remote guidance server 20 outputs a message that the destination cannot be reached and finishes the processing of the route search (S1199). Or the processing may be conducted from S1102 again under a condition relaxed by increasing the cruising distance of the electromotive vehicle obtained when fully charged or adding a charging station capable of being subject to not only rapid charging but also ordinary charging.

Contents which are output at S1190 or S1199 are transmitted from the communication apparatus 230 in the remote guidance server 20 to the route search request processing unit 111 in the mobile 10 which has transmitted the route search request via the network 50 as a response to the route search request.

Figure 8:
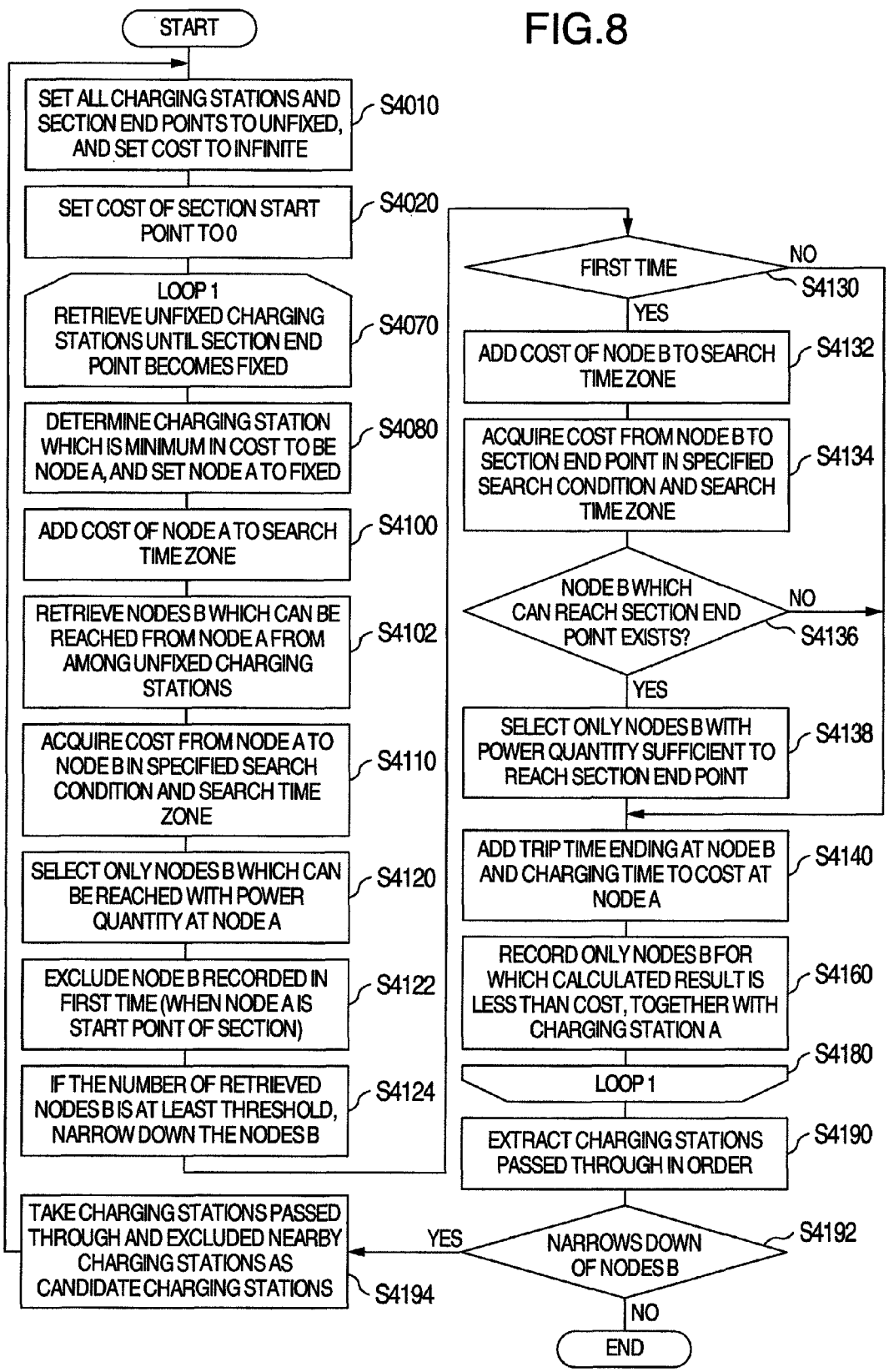
FIG. 8 is a flow chart showing an example of partial processing conducted by the route search processing unit.

FIG. 8 is a flow chart showing extraction of charging stations which make it possible to travel efficiently without causing battery exhaustion conducted at S1160 in FIG. 7 by processing (the route search processing unit 211) in the central processing unit (CPU) 210 which is mounted on the remote guidance server 20. Here, the flow chart will be described by using the Dijkstra's algorithm.

The route search processing unit 211 in the remote guidance server 20 provides a work area in the storage apparatus 250 by using a charging station ID 2550 which identifies a charging station or a start point or an end point of a section, fixing information 2551 which indicates whether a cost of the charging station is fixed, an immediately preceding charging station ID 2552 passed through before reaching the charging station, and a cost 2553 at the time of reaching the charging station as node information as shown in FIG. 10, in association with each of all charging stations, start points and end points of sections, charging stations in the vicinity of start point, and charging stations in the vicinity of end point which are acquired at S1140, S1152 and S1153 shown in FIG. 7 and narrowed down at S1185 in some cases, and initializes every provided fixing information 2551 to unfixed and every provided cost 2553 to infinite (S4010). Here, the start points and end points of sections are also handled as charging stations. As regards the charging station ID 2550 shown in FIG. 10, for example, a start point of a section is provided with −1 and an end point of the section is provided with −2.

The route search processing unit 211 in the remote guidance server 20 sets the cost 2553 of a start point of a section, that is, data which is −1 in the charging station ID 2550 shown in FIG. 10 to 0 (S4020).

In the ensuing processing, route search is conducted successively starting from a start point of a section toward a charging station and an end point of the section. When executing route search from a start point of a section or a certain charging station taken as a starting point toward another charging station or an end point of the section taken as an ending point, the start point of the section or the charging station taken as the starting point is represented as node A and the charging station or the end point of the section taken as the ending point is represented as node B. A flag for preventing a charging station subjected to route search as the node A once from becoming a processing object as the node A again is the fixing information 2551 shown in FIG. 10. In other words, "fixed" in the fixing information 2551 in FIG. 10 indicates that the charging station is already subjected to route search as the starting point (node A), whereas "unfixed" indicates that the charging station is not yet subjected to route search.

In the ensuing processing, it is supposed that the cost is a trip time including charging time. In the inter-charging-station cost 252 shown in FIG. 3 and the charging station information processing unit 212 in FIG. 6, the traveling distance 2524, the trip time 2525, and the power consumption quantity 2525 are taken as the cost. Here, however, the cost is determined to be the trip time including the charging time for brevity of the description. The traveling distance or the power consumption quantity may be determined to be the cost, or a combination of them may be determined to be the cost.

The route search processing unit 211 in the remote guidance server 20 retrieves charging stations having "unfixed" in the fixing information 2551 in FIG. 10 which is preset in the work area and repeats the ensuing processing until the fixing information 2551 of the end point of the section shown in FIG. 10 becomes "fixed" (S4070).

The route search processing unit 211 in the remote guidance server 20 determines one of the charging stations acquired at S4070, start points of sections, or end points of the section which is minimum in the cost 2553 shown in FIG. 10 to be the node A, and sets the fixing information 2551 of the node A to "fixed" (S4080).

The route search processing unit 211 in the remote guidance server 20 sets a value obtained by adding an origin time zone received from the mobile 10 or a relay terminal to the cost 2553 of the node A, as the origin time zone of the node A (S4100).

The route search processing unit 211 in the remote guidance server 20 extracts charging stations which can be reached from the node A by fully charging a general electromotive vehicle and which are "unfixed" in the fixing information 2551 in FIG. 10 from among the charging stations acquired at S4070, start points of sections, or end points of the section on the basis of the inter-charging-spot cost 252 in FIG. 3, and determines a plurality of extracted charging stations to be nodes B (S4102). Each of the charging stations coupled to the node A is represented by the destination charging station ID 2521 in the inter-charging-station cost 252 associated with the origin charging station ID 2520 having the node A.

Figure 12:
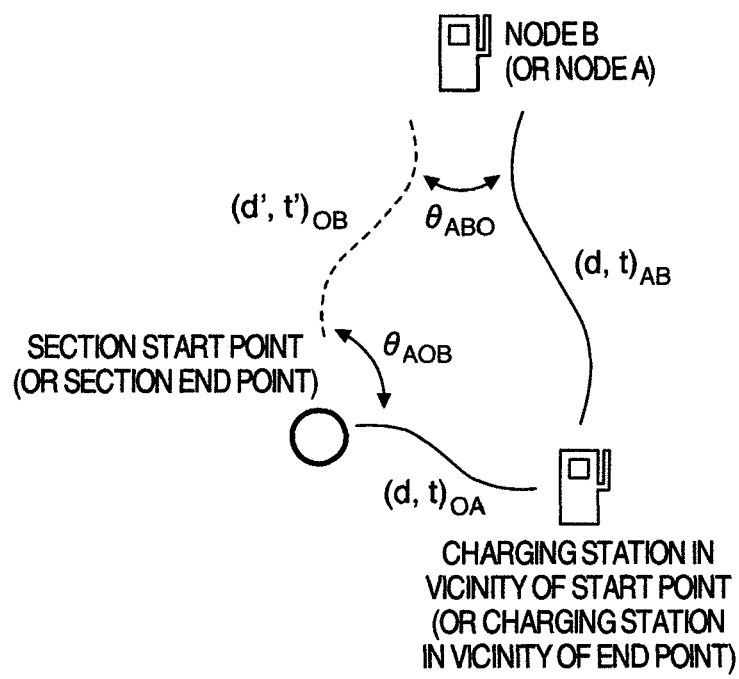
FIG. 12 is a diagram for explaining an example of parameters in FIG. 11.

The route search processing unit 211 in the remote guidance server 20 acquires the traveling distance from the node A determined at S4080 to each of the nodes B determined at S4102, the power consumption quantity, and expected time of arrival at the node B, in accordance with the search condition received from the mobile 10 or the relay terminal, and the origin time zone calculated at S4100 (S4110). As for the traveling distance, the expected time of arrival, and the power consumption quantity, the traveling distance 2524 in the inter-charging-station cost 252 in which the origin charging station ID 2520, the destination charging station ID 2521, the search condition 2522, and the origin date and hour ID 2523 fall under the node A, the node B, the received search condition, and the calculated origin time zone, respectively, a value obtained by adding the calculated origin time zone to the trip time 2525, and the power consumption quantity 2526 are used. If the node A is a start point of a section, then data which falls under the inter-charging-station cost 252 does not exist, and consequently the traveling distance, the traveling time, and the power consumption quantity required as far as the node B, must be calculated newly. For example, the traveling distance and the traveling time from the start point of the section to the node B are calculated in approximation shown in FIG. 11 by using the traveling distance and the traveling time from the start point of the section to the charging station in the vicinity of start point which is closest to the start point of the section calculated at S1152, the traveling distance and the traveling time from the charging station in the vicinity of start point to the node B in the inter-charging-station cost 252, and their respective latitudes and longitudes. In FIG. 11, d denotes a traveling distance, t denotes a traveling time, d' denotes an approximated traveling distance, and t' denotes an approximated traveling time. As shown in FIG. 12, $(d, t)_{OB}$ denotes the traveling distance and the traveling time from the start point of the section to the charging station in the vicinity of start point which is closest to the start point of the section, $(d, t)_{AB}$ denotes the traveling distance and the traveling time from the charging station in the vicinity of start point to the node B, $\theta_{AOB}$ denotes an angle formed by a straight line coupling the charging station in the vicinity of the start point to the start point of the section and a straight line coupling the start point of the section to the node B, and $\theta_{ABO}$ denotes an angle formed by a straight line coupling the charging station in the vicinity of the start point to the node B and a straight line coupling the node B to the start point of the section. The angles $\theta_{AOB}$ and $\theta_{ABO}$ are found from latitudes and longitudes of respective spots. As for the calculation of the power consumption quantity from the start point of the section to the node B, power consumption quantities of respective links may be summed up, or the ratio of the power quantity obtained when fully charged to the cruising distance of the general electromotive vehicle obtained when fully charged may be multiplied by a traveling distance from the start point of the section to the node B, as described in the explanation of S1260. If the node B is an end point of a section, then in the same way data which falls under the inter-charging-station cost 252 does not exist, and consequently the traveling distance and the traveling time from the node A to the end point of the section and the power consumption quantity are calculated in approximation in the same way as FIG. 11 by using the traveling distance and the traveling time from the charging station in the vicinity of end point which is closest to the end point of the section calculated at S1154, and the traveling distance and the traveling time from the node A to the charging station in the vicinity of end point in the inter-charging-station cost 252, and their respective latitudes and longitudes. In this case, in FIG. 11, $(d, t)_{OB}$ is replaced by the traveling distance and the traveling time from the node A to the end point of the section, $(d, t)_{OA}$ is replaced by the traveling distance and the traveling time from the charging station in the vicinity of end point which is closest to the end point of the section to the end point of the section, $(d, t)_{AB}$ is replaced by the traveling distance and the traveling time from the node A to the charging station in the vicinity of end point, $\theta_{AOB}$ is replaced by an angle formed by a straight line coupling the charging station in the vicinity of the end point to the end point of the section and a straight line coupling the end point of the section to the node A, and $\theta_{ABO}$ is replaced by an angle formed by a straight line coupling the charging station in the vicinity of the end point to the node A and a straight line coupling the node A to the end point of the section. Or if the number of nodes B or the nodes A is small and the distance is short, they may be found by actually executing the route search or may be approximated by replacing with straight line distances.

The route search processing unit 211 in the remote guidance server 20 compares the power consumption quantity obtained at S4110 with the power quantity at the node A. If the node A is a start point of a section, the power quantity at the node A is the residual quantity in the battery obtained at S1102 or S1186. If the node B is an end point of a section, the power quantity at the node A is the residual quantity in the battery obtained at S1156. Otherwise, the power quantity at the node A is the power quantity of a general electromotive vehicle obtained when fully charged. Only in the case where the power consumption quantity from the node A to the node B is less than the power quantity at the node A, the node B is selected. If the power consumption quantity from the node A to the node B is at least the power quantity at the node A, selection is not conducted (S4120). Also in the case where the business hours 2515 or the full/vacancy information 2517 in the charging station information 251 are referred to, and the expected time of arrival at the node B is not in business hours or the node B is in the full state, the node B is not selected. At S4120, a node B at which a mobile departing with a residual quantity in battery at the node A can arrive is selected.

Although there is a possibility that each of charging stations located at a reachable range from the start point of the section will become a first waypoint, the charging station does not become a second or later waypoint. Because it is efficient to visit these charging stations first as compared with when visiting them after visiting a charging station somewhere. If the loop 1 is not a first time (that is, the node A is not a start point of a section), therefore, the route search processing unit 211 in the remote guidance server 20 excludes a node B extracted when the loop 1 is the first time, from among a plurality of nodes B extracted at S4120 (S4122). For example, if in FIG. 9 the charging station A and the charging station B are in a reachable range from the origin and the charging station C is located outside the reachable range, then the start point of the section (the origin) is set as the node A at S4080 in the first time, and the charging station A and the charging station B are set as the nodes B at S4120 in the first time. When the charging station A is set as the node A at S4080 in a second time, the charging station B and the charging station C are set as the nodes B at S4120 in the second time, but the charging station B is excluded from the nodes B at S4122.

If the number of nodes B extracted at S4120 and S4122 is large, then it takes a long time to conduct the whole processing. If the number of nodes B extracted at S4120 and S4122 is at least a predetermined threshold, therefore, the route search processing unit 211 in the remote guidance server 20 narrows down the nodes B in accordance with a certain condition (S4124). For example, the threshold is set equal to 200. For example, the condition for narrowing down the nodes B may be to be within a range of −45 degrees to +45 degrees about a direction from the node A to the end point of the section. The condition for narrowing down the nodes B may be that the traveling distance 2524 from the node A is at least 10 km. Or the condition for narrowing down the nodes B may be to be within a range of a distance obtained by subtracting 30 km from a longest traveling distance 2524 among traveling distances 2524 from the node A to the nodes B extracted at S4120 and S4122. If the user specifies a specified charging station to be passed through at S1102, however, the charging station is excluded from objects to be narrowed down.

In ensuing processing at S4130 to S4138, a charging station which is located in a reachable range from a start point of a section and which includes an end point of the section in a reachable range at the time when fully charged is retrieved. If one or more pertinent charging stations exist, thereafter only the pertinent charging stations are taken as objects and charging stations which do not fall under the condition are excluded.

If the loop 1 is a first time (that is, the node A is a start point of a section), then the route search processing unit 211 in the remote guidance server 20 proceeds to S4132. Unless the loop 1 is the first time, then the route search processing unit 211 in the remote guidance server 20 proceeds to S4140 (S4130).

If the loop 1 is the first time, then the route search processing unit 211 in the remote guidance server 20 sets a value obtained by adding a time zone at the node A and a traveling time to the node B, as an origin time zone of the node B (S4132).

The route search processing unit 211 in the remote guidance server 20 acquires a traveling distance and a power consumption quantity from each of the nodes B to the end point of the section which are determined at steps ending at S4124 in accordance with the search condition received from the mobile 10, the relay terminal, or the like and the origin time zone calculated at S4132 (S4134). The traveling distance, the traveling time, and the power consumption quantity are calculated by using FIG. 11 in the same way as S4110.

The route search processing unit 211 in the remote guidance server 20 makes a decision whether a node B from which the end point of the section can be reached exists, on the basis of a result of the processing conducted at S4134 (S4136). It is estimated at S4136 whether the end point of the section can be reached in a state in which a needed residual quantity in the battery at the end point of the section calculated at S1156 is left. If at least one node B from which the end point can be reached exists, the route search processing unit 211 in the remote guidance server 20 proceeds to S4138. If any node B from which the end point can be reached does not exist, the route search processing unit 211 in the remote guidance server 20 proceeds to S4140.

If at least one node B from which the end point can be reached exists at S4136, the route search processing unit 211 in the remote guidance server 20 selects only pertinent nodes B and excludes other nodes B (S4138).

The route search processing unit 211 in the remote guidance server 20 calculates a value obtained by adding a trip time ending at the node B and a charging time at the node B to the cost 2553 at the node A (S4140). Here, the charging time is calculated by dividing the power consumption quantity required until the node B is reached by a charging rate of a general rapid charging apparatus. If the user specifies a specified charging station to be passed through at S1102 and the node A is the specified charging station, then a result of the calculation is multiplied by a positive coefficient less than 1. If the node B is the specified charging station, then a result of the calculation is multiplied by a positive coefficient less than 1. The positive coefficient less than 1 is an arbitrary constant, and it may be 0.5, or it may be 0.1, or it may be another constant. For example, the coefficient is set equal to 0.5. If a value obtained by adding a trip time ending at the node B and a charging time at the node B to the cost 2553 at the node A is 48 and the node A or the node B is the specified charging station, then a calculation result becomes 24. If the node A and the node B are the specified charging stations, then a calculation result becomes 12.

The route search processing unit 211 in the remote guidance server 20 compares a result of the calculation conducted at S4140 with the current cost 2553 at the node B. The initial value of the current cost 2553 at the node B is infinite which is set at S4010. If a charging station or an end point of a section taken as a processing object as the node B was already processed as the node B when a charging station other than the charging station at the node A was taken as the node A, the cost 2553 was found at the time of that processing at S4160 which will be described later. The cost 2553 already found as the node B is the current cost. If the result of the calculation at S4140 is less than the current cost 2553 at the node B, then the result of the calculation at S4140 is taken as the cost 2553 at the node B, and the node A is recorded as the immediately preceding charging station 2552 for the node B (S4160). If the result of the calculation at S4140 is at least the current cost 2553 at the node B, then nothing is conducted. As a result, an immediately preceding node A which forms a minimum cost route to the node B is determined.

If the fixing information 2551 of the end point of the section is unfixed, then the route search processing unit 211 in the remote guidance server 20 returns to S4070 (S4180). If the fixing information 2551 of the end point of the section is fixed, then the route search processing unit 211 in the remote guidance server 20 proceeds to S4190.

In the processing of the loop 1 ranging from S4070 to S4180, the start point of the section or the charging station found by the processing at S4080 is taken as the node A and the processing is continued until the fixing information 2551 at the end point of the section becomes fixed.

The route search processing unit 211 in the remote guidance server 20 extracts charging stations passed through from the start point of the section to the end of the section by tracing an immediately preceding charging station ID 2552 in order from the end point of the section on the basis of data of the immediately preceding charging station ID 2552 recorded at S4160 (S4190).

If the narrowing down of nodes B is executed even once at S4124, then the route search processing unit 211 in the remote guidance server 20 proceeds to S4184. If narrowing down is not executed at all, then the processing for extracting charging stations which make it possible to travel efficiently without battery exhaustion (S4192).

If narrowing down of nodes B is executed even once at S4124, then the route search processing unit 211 in the remote guidance server 20 takes the charging stations extracted at S4190 and charging stations excluded when executing the narrowing down as candidate charging stations and returns to S4010 (S4194). Charging stations added to the candidate charging stations are determined to be charging stations extracted at S4190 and charging stations in their vicinities (for example, within a radius of 5 km).

According to the embodiment described heretofore, it is possible to extract charging stations which make it possible to travel efficiently without battery exhaustion (in a state in which the power quantity represented as the residual quantity in the battery >0 is maintained) and output a route passing through the extracted charging stations. As a result, driving is supported to prevent a mobile such as an electromotive vehicle from becoming impossible to reach a charging station. Thereby, it is made possible to provide the driver with a sense of security and contribute to spread acceleration of electromotive vehicles.

Furthermore, a route can be found by previously calculating and retaining a cost between charging stations.

Furthermore, it is possible to output a route which is more convenient by utilizing real time information such as business hours and the full/vacancy situation of charging stations.

Furthermore, it is possible to output a route with higher precision by predicting the power consumption quantity on the basis of probe information received from the mobile.

Reference Signs List

10: mobile, 20: remote guidance server, 30: position information transmitter, 40: radio communication base station, 50: network, 110: central processing unit, 111: route search request processing unit, 112: vehicle state processing unit, 120: position detection apparatus, 130: radio communication apparatus, 140: output apparatus, 150: battery management apparatus, 210: central processing unit, 211: route search processing unit, 212: charging station information processing unit, 213: power consumption information processing unit, 230: communication apparatus, 250: storage apparatus, 251: charging station information, 252: inter-charging-station cost, 253: probe information, 254: power consumption map, 255: numerical value map.

The invention claimed is:

1. A vehicle drive support system which conducts route search from an origin to a destination by taking positions of charging stations for a battery mounted on a vehicle into consideration, the vehicle drive support system comprising:
   a charging station information processing unit; and
   a route search processing unit,
   wherein, the charging station information processing unit manages charging station information for managing attribute information containing position information of a plurality of charging stations, and
   wherein, when forming a route from the origin to the destination of at least one section having the origin or a waypoint as a start point and a waypoint or the destination as an end point, in route search from a start point of a section to an end point of the section, in order to cause a residual quantity in the battery at time when the vehicle has reached the end point to be at least a quantity with which the vehicle can travel to one of the charging stations, the route search processing unit executes selection of the charging station to be passed and searching of a route from the start point of the section to the end point of the section via the selected charging station by referring to the charging station information.

2. The vehicle drive support system according to claim 1, further comprising a charging station information processing unit for calculating a cost between charging stations on the basis of the position information of the charging stations and managing the cost as inter-charging-station cost information,
   wherein the route search processing unit searches a minimum cost route as a route passing through the charging stations, by using the inter-charging-station cost information stored in a storage apparatus.

3. The vehicle drive support system according to claim 2, wherein
   the charging station information contains business hour information and/or full/vacancy situation information as the attribute information, and
   at time of the route search, the route search processing unit does not take the charging stations having attribute information which satisfies a predetermined condition as an object of the selection of the charging station.

4. The vehicle drive support system according to claim 2, wherein
   the cost is at least one of a traveling distance, a trip time, and a power consumption quantity of the vehicle, and
   if the trip time is included as the cost, then the route search processing unit adds a time required to reach the charging station and a charging time at the charging station as the cost.

5. The vehicle drive support system according to claim 1, further comprising a power consumption information processing unit for estimating a power consumption quantity of a road section corresponding to position information of the vehicle on the basis of probe information containing the position information of the vehicle and the residual quantity in the battery transmitted by the vehicle and storing the estimated power consumption quantity in a storage apparatus as a power consumption map,
   wherein the route search processing unit calculates a power consumption quantity of the vehicle by using the power consumption map stored in the storage apparatus, and evaluates whether a state in which the residual quantity in the battery is greater than 0 can be maintained on the basis of the calculated power consumption quantity.

* * * * *